United States Patent [19]
Wakasugi

[11] Patent Number: 5,689,730
[45] Date of Patent: Nov. 18, 1997

[54] NETWORK INTERFACE APPARATUS ADAPTABLE TO MULTIFUNCTION PERIPHERAL APPARATUS

[75] Inventor: Naoki Wakasugi, Yokohama, Japan

[73] Assignee: Ricoh Company, Ltd., Tokyo, Japan

[21] Appl. No.: 554,573

[22] Filed: Nov. 6, 1995

[30] Foreign Application Priority Data

Nov. 15, 1994 [JP] Japan .................................. 6-280772
Oct. 17, 1995 [JP] Japan .................................. 7-268572

[51] Int. Cl.[6] ............................ G06F 12/00; G06F 13/00
[52] U.S. Cl. .............. 395/876; 395/497.01; 395/497.02; 395/821; 395/820; 395/831; 364/DIG. 1
[58] Field of Search .................... 395/497.01, 497.02, 395/821, 830, 831, 876

[56] References Cited

U.S. PATENT DOCUMENTS

| | | | |
|---|---|---|---|
| 4,937,827 | 6/1990 | Beck et al. | 371/23 |
| 4,965,748 | 10/1990 | Chang et al. | 364/519 |
| 5,247,674 | 9/1993 | Kogure | 395/650 |
| 5,305,056 | 4/1994 | Salgado et al. | 355/202 |
| 5,588,138 | 12/1996 | Bai et al. | 395/497.04 |
| 5,598,279 | 1/1997 | Ishii et al. | 358/402 |

*Primary Examiner*—Frank J. Asta
*Attorney, Agent, or Firm*—Oblon, Spivak, McClelland, Maier & Neustadt, P.C.

[57] ABSTRACT

A LAN interface apparatus determines which function of a plurality of functions of a multifunction peripheral apparatus is to be used. This determination may be performed by determining which function of the plurality of functions is selected in the multifunction peripheral apparatus. This selection may be performed as a result of a user specifying a desired function by pressing a relevant key provided on the multifunction peripheral apparatus. The multifunction peripheral apparatus then sends information to the LAN interface apparatus which thus determines the function being used in the multifunction peripheral apparatus. Then, the LAN interface apparatus appropriately alters a data storage area of a common memory and thus a resulting data storage area of the common memory is appropriate for a data flowing ratio between data flowing along two opposite directions, which ratio depends on the function being selected in the multifunction peripheral apparatus.

8 Claims, 8 Drawing Sheets

NETWORK INTERFACE APPARATUS ADAPTABLE TO MULTIFUNCTION PERIPHERAL APPARATUS

BACKGROUND OF THE INVENTION

1. Field of the Invention

The present invention relates to a network interface apparatus, in particular to a LAN (Local Area Network) interface apparatus. The present invention further in particular relates to a LAN interface apparatus inserted between a LAN and a multifunction peripheral apparatus which has a plurality of functions such as a printer function, a scanner function, a facsimile function and so forth. The LAN interface apparatus includes a common memory and uses the common memory as a media through which information is appropriately communicated between the LAN and multifunction peripheral apparatus.

2. Description of Related Art

Various types of multifunction peripheral apparatus also having a function of communicating information with a LAN will now be described.

1. Three types of multifunction peripheral apparatus classified according to particular hardware construction will now be described.

(1) In a first type, a LAN interface apparatus in a form of an option board is connected to an extension bus of a multifunction peripheral apparatus. Such a form of a LAN interface apparatus may be referred to as a 'multifunction peripheral-apparatus LAN board' or simply, a 'LAN board'. Then, a CPU included in the LAN board controls an information communication operation in accordance with a LAN protocol.

(2) In a second type, similarly to the first type, the LAN interface apparatus in the form of the LAN board is connected to an extension bus of the multifunction peripheral apparatus. Then, a main CPU included in the multifunction peripheral apparatus controls an information communication operation in accordance with the LAN protocol.

(3) In a third type, a construction for performing a LAN interface operation is included in a main board of the multifunction peripheral apparatus, and the main CPU of the multifunction peripheral apparatus controls an information communication operation in accordance with the LAN protocol.

Generally speaking, because it is possible to reduce a load borne by the main CPU of the multifunction peripheral apparatus and because it is not necessary for the main board of the multifunction peripheral apparatus to operate in accordance with the LAN protocol, the first type is used in the multifunction peripheral apparatus in many cases.

2. Four types of multifunction peripheral apparatus classified according to particular software construction will now be described.

(1) In a first type, the relevant LAN protocol is a single-function protocol (usable only for a single function such as a printer function or the like), and a data stream between the LAN board and multifunction peripheral apparatus is a single stream.

(2) In a second type, the relevant LAN protocol is a single-function protocol (usable only for a single function such as a printer function or the like), and two data streams are provided between the LAN board and multifunction peripheral apparatus. In this type, when the multifunction peripheral apparatus is used as a printer, it is possible to simultaneously receive printing requests from two workstations (referred to as WS's, hereinafter) via the two data streams. Then, data to be printed out relevant to the printing requests may be first spooled in the multifunction peripheral apparatus. Alternatively, by spooling data to be printed out relevant to the printing requests in the LAN board, it is possible to simultaneously receive two printing requests from the two WS's although only a single data stream is provided between the LAN board and multifunction peripheral apparatus.

(3) In a third type, the relevant LAN protocol is a multifunction protocol (usable for a plurality of functions such as a printer function and a scanner function), and a data stream between the LAN board and multifunction peripheral apparatus is a single stream. TCP/IP, NetWare (trademark), AppleTalk (trademark) or the like may used as the multifunction protocol. A spooling operation such as that described above in the description of the second type may also be performed in the third type.

(4) In a fourth type, the relevant LAN protocol is the multifunction protocol, and two data streams are provided between the LAN board and multifunction peripheral apparatus. A spooling operation such as that described above in the description of the second type may also be performed in the third type.

Generally speaking, the third type is used in the multifunction peripheral apparatus in many cases.

By preparing the LAN interface apparatus appropriate for the particular LAN for connecting the multifunction peripheral apparatus with the LAN, it is not necessary to produce a construction for performing the LAN interface operation to be incorporated in the multifunction peripheral apparatus each time a new type of the multifunction peripheral apparatus is developed.

The meaning of the matter that the multifunction peripheral apparatus has a plurality of functions such as a printer function, a scanner function, a facsimile function and so forth will now be described. This matter does not mean that one of the plurality of functions is solely used in the apparatus. In contrast to this, a case may be assumed in which a user uses the apparatus and thus the user performs through the apparatus a single function such as a copy function in which an original is read in and a plurality of copies are produced. In this case, the apparatus may simultaneously perform a facsimile reception operation. Thus, a plurality of functions are simultaneously performed and it is not easy to estimate how many functions will be simultaneously performed.

What is demanded from the multifunction peripheral apparatus is that when a user wishes to use the apparatus for some function, the user can use it soon without waiting until a task which the apparatus is currently doing has been completed. Specifically, the apparatus coordinates the task currently being done and another task currently being requested to be done. Thus, the apparatus does the task currently being requested to be done before the task currently being done has been completed. In order to realize simultaneous execution of the plurality of functions, a control operation in the multifunction peripheral apparatus should include an operation for coordinating the plurality of functions, using a management program, a special device, or the like.

In the LAN interface apparatus in the related art, each of a data amount to be transmitted from the LAN to the multifunction peripheral apparatus and a data amount to be transmitted from the multifunction peripheral apparatus to the LAN is changed when a function is changed to another function among the plurality of functions of the multifunction peripheral apparatus. Accordingly, each of necessary capacities of storage areas, used when data is transmitted between the LAN and the multifunction peripheral apparatus, in the common memory used as a media, for use in efficient, high-speed data transmission, is changed when a function being executed is changed.

When the printer function is used in the multifunction peripheral apparatus, for example, a large amount of data is sent to the LAN interface apparatus from the WS via the LAN to be then sent to the multifunction peripheral apparatus to be printed out. For this purpose, a large capacity is required of a corresponding storage area in the common memory. In comparison with this data amount, an amount of data to be sent from the multifunction peripheral apparatus to the LAN interface apparatus, and then to the WS via the LAN, is very small. Therefore, a relatively small capacity is required of a corresponding storage area in the common memory.

When the scanner function is used in the multifunction peripheral apparatus, for example, a large amount of data is sent from the multifunction peripheral apparatus to the LAN interface apparatus, then to the WS via the LAN. For this purpose, a large capacity is required of a corresponding storage area in the common memory. In comparison with this data amount, an amount of data to be sent to the LAN interface apparatus from the WS via the LAN, to be then sent to the multifunction peripheral apparatus, is very small. Therefore, a relatively small capacity is required of a corresponding storage area in the common memory.

The same common memory is used in the LAN interface apparatus when the printer function is executed and also when the scanner function is executed. Accordingly, the common memory should have the large capacity for the storage area for data sent from the WS to the multifunction peripheral apparatus via the LAN when the printer function is executed, and also the other large capacity for the storage area for data sent from the multifunction peripheral apparatus to the WS via the LAN when the scanner function is executed. As a result, the common memory should have a very large capacity and thus should be costly and have large outline dimensions disadvantageously. Further, if the two large-capacity storage areas are provided as mentioned above, one of the two may be effectively used but the other may not be effectively used when each function is used. In other words, a certain substantial part of the storage capacity of the common memory is always left unused. Thus, the common memory is not used efficiently.

SUMMARY OF THE INVENTION

An object of the present invention is to provide a LAN interface apparatus in which a common memory may be efficiently used and thus a relatively small storage capacity is required for efficiently performing information communication between a WS or the like and a multifunction peripheral apparatus via a LAN when a plurality of different functions are performed by the multifunction peripheral apparatus.

A LAN interface apparatus according to the present invention determines which function of a plurality of functions of a multifunction peripheral apparatus is to be used. This determination may be performed by determining which function of the plurality of functions is selected in the multifunction peripheral apparatus. This selection may be performed as a result of a user specifying a desired function by pressing a relevant key provided on the multifunction peripheral apparatus. The multifunction peripheral apparatus then sends information to the LAN interface apparatus which thus determines the function being used in the multifunction peripheral apparatus. Then, the LAN interface apparatus appropriately alters a data storage area of a common memory and thus a resulting data storage area of the common memory is appropriate for a data flowing ratio between data flowing along two opposite directions, which ratio depends on the function being selected in the multifunction peripheral apparatus.

For example, when the multifunction peripheral apparatus is used as a printer, almost all of a data flowing amount between the multifunction peripheral apparatus and a WS is that flowing from the WS to the multifunction peripheral apparatus. When the multifunction peripheral apparatus is used as a scanner, almost all of a data flowing amount between the multifunction peripheral apparatus and the WS is that flowing from the multifunction peripheral apparatus to the WS.

As a result, a single one of the LAN interface apparatus may be commonly used for the multifunction peripheral apparatus used in the plurality of functions. Further, because the data-storage-area allocation of the common memory is controlled adaptably to the function being selected, the common memory is effectively used in data communication between the multifunction peripheral apparatus and the WS or the like via a LAN. Thus, the data communication can be performed at high speed through a relatively simple construction.

The selection of the function may alternatively be performed from the WS as a result of the WS generating a command for instructing the multifunction peripheral apparatus to select a relevant function. This command is also used by the LAN interface apparatus for altering the data-storage-area allocation so as to make it appropriate for the thus-selected relevant function.

The selection of the function may alternatively be performed from the WS as a result of the LAN interface apparatus analyzing data sent from the WS when a session is being established and thus determining which function is relevant to a protocol being used in relevant data communication. This command is also used by the LAN interface apparatus for altering the data-storage-area allocation so as to make it appropriate for the thus-selected relevant function.

Other objects and further features of the present invention will become more apparent from the following detailed description when read in conjunction with the accompanying drawings.

DESCRIPTION OF PREFERRED EMBODIMENTS

Figure 1:
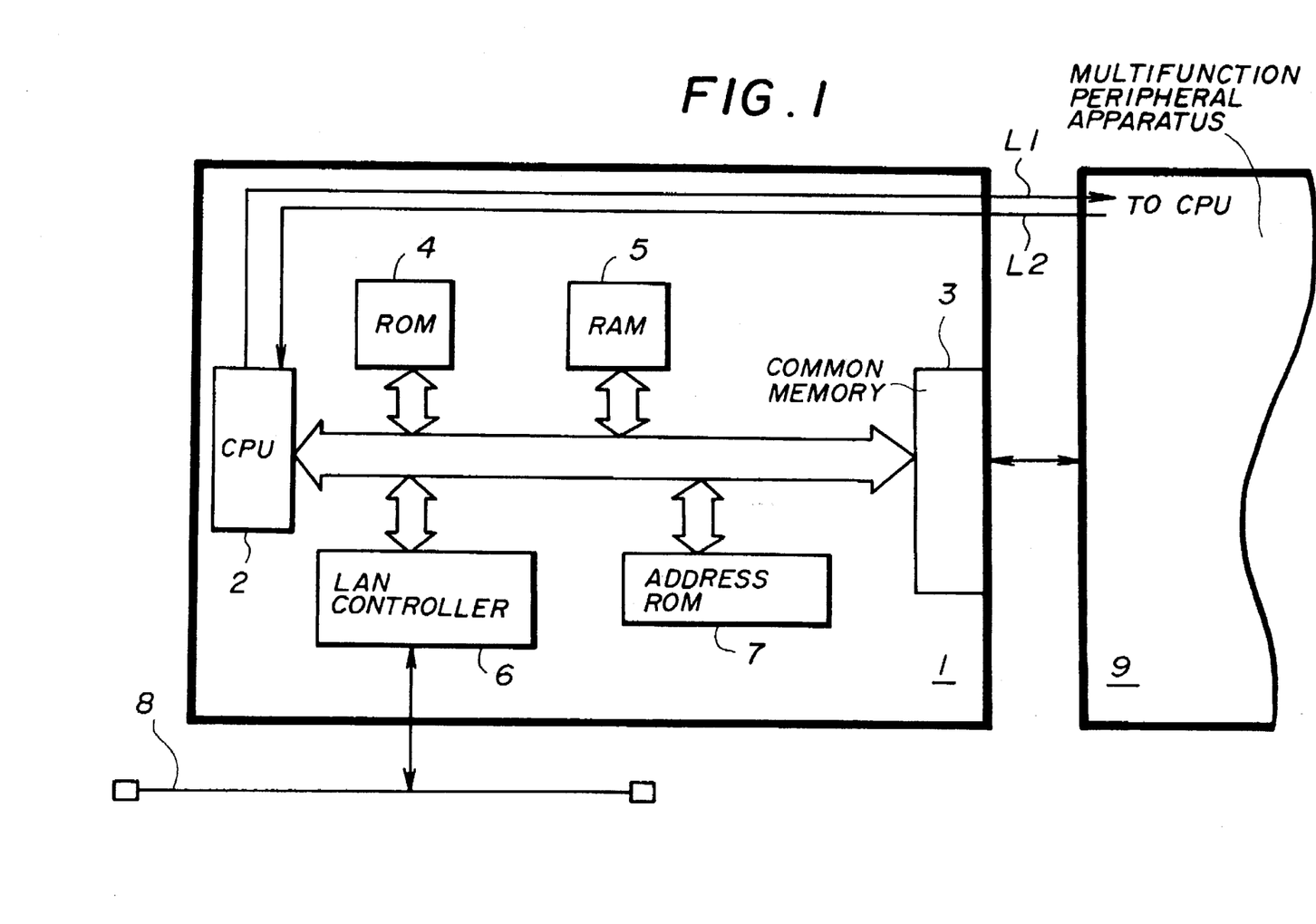
FIG. 1 shows a block diagram of a system using a LAN interface unit in a first embodiment of the present invention.

With reference to FIG. 1, a system using a LAN interface apparatus in a first embodiment of the present invention will now be described. In the system, the LAN interface apparatus (referred to as a 'LAN board', hereinafter) 1 is connected between a local area network (abbreviated as 'LAN', hereinafter) 8 and a multifunction peripheral apparatus 9.

The LAN board 1 includes a microcomputer including a CPU 2, a common memory 3, a ROM 4, a RAM 5, a LAN controller 6 and an address ROM 7. The CPU 2 performs control of the entirety of the LAN board 1. The CPU 2 performs control of data communication between the LAN 8 and multifunction peripheral apparatus 9 through the common memory 3. The CPU 2 performs control of alteration of a data storage format of the common memory 3 according to a selection of a function among a plurality of functions of the multifunction peripheral apparatus 9.

The common memory 3 stores data which is transmitted between the LAN 8 and multifunction peripheral apparatus 9. The ROM 4 is a read-only memory and stores various control programs and so forth. The RAM 5 is a readable, writeable memory and is used as a work area by the CPU 2 when the CPU 2 performs various kinds of operations.

The LAN controller 6 is connected to the LAN 8 and performs control of data communication between a computer connected to the LAN 8 and the LAN board 1 in accordance with a predetermined protocol. The address ROM 7 is a memory for storing addresses which the CPU 2 and LAN controller 6 refer to when performing various kinds of operations.

The LAN 8 has computers such as WS's connected thereto, and is used by the computers for communicating with the multifunction peripheral apparatus 9 through the LAN board 1.

The multifunction peripheral apparatus 9 is thus used by the computers connected to the LAN 8 and has a plurality of functions such as a printer function, a scanner function and a facsimile function. A CPU of the multifunction peripheral apparatus 9 is connected to the CPU 2 of the LAN board 1 via interrupt lines L1 and L2, and also to the common memory 3 via a data bus. The interrupt lines L1 and L2 are communications lines for sending commands between the multifunction peripheral apparatus 9 and LAN board 1.

In the system, when an electric power is supplied, a data storage format of the common memory 3 is initially set. Accordingly, half of the entire area of the common memory 3 is filled with an area A for storing data which is input from the LAN 8 and then output to the multifunction peripheral apparatus 9, and the other half is filled with an area B for storing data which is input from the multifunction peripheral apparatus 9 and then output to the LAN 8. Then, the multifunction peripheral apparatus 9 sends a request to the LAN board 1 to alter the data storage format of the common memory 3, and the LAN board 1 alters the data storage format of the common memory 3 according to the request.

Figure 2:
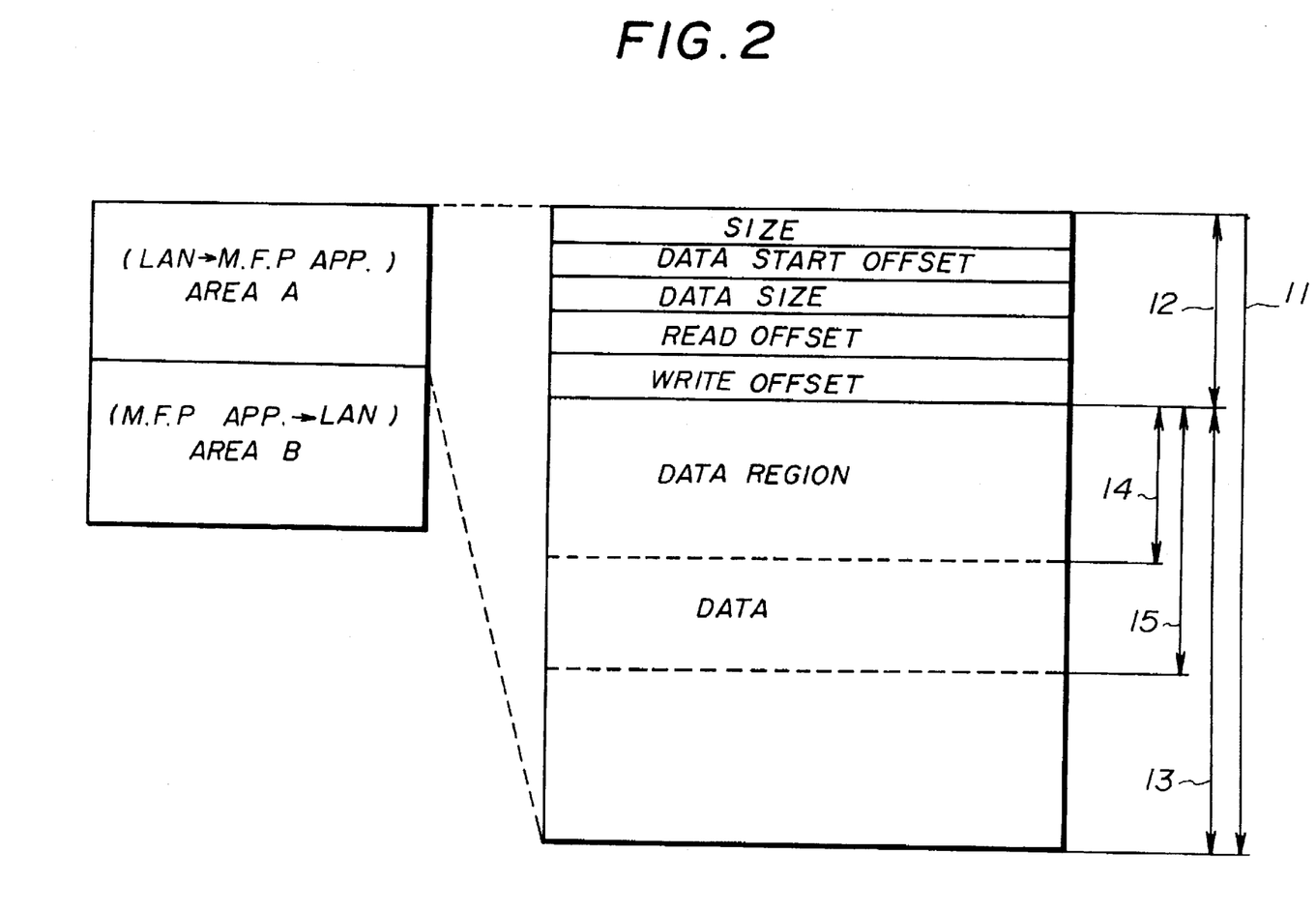
FIG. 2 shows an example of a format of a common memory in a LAN board in the system shown in FIG. 1.

With reference to FIG. 2, an example of the data storage format of the common memory 3 in the LAN board 1 will now be described. Each of the above-mentioned areas A and B is further divided into a plurality of regions as will be described. Although FIG. 2 shows contents of the area A, contents of the area B are the same as those of the area A.

A SIZE region stores a size 11 of the entirety of the data storage area A. A DATA START OFFSET region stores an offset 12 to a start address of a region in the area A which is used for storing data being transmitted. A DATA SIZE region stores a size 13 of the region which is used for storing data being transmitted.

A READ OFFSET region stores an address up to which data has been read out from the region which is used for storing data being transmitted. For example, a portion indicated by a numeral '15' shown in FIG. 2 is a portion from which the data has been read out, this portion is the read offset and the address stored in the READ OFFSET region is the last address of the portion. This address indicates a position of the data, up to which a data-reading apparatus has read out the data, and is an address counted from a start address of the data. The address is written by the data-reading apparatus and referred to by the data-writing apparatus.

A WRITE OFFSET region stores an address up to which the data has been written in the region in the area A which is used for storing data being transmitted. For example, a portion indicated by a numeral '14' shown in FIG. 2 is a portion in which the data has been written, this portion is the write offset and the address stored in the WRITE OFFSET region is the last address of the portion. This address indicates a position of data, up to which the data-writing apparatus has written the data, and is an address counted from the start address of the data. The address is written by the data-writing apparatus and referred to by the data-reading apparatus. A DATA region stores various kinds of data such as image data and acts as a ring buffer.

Figure 3A:
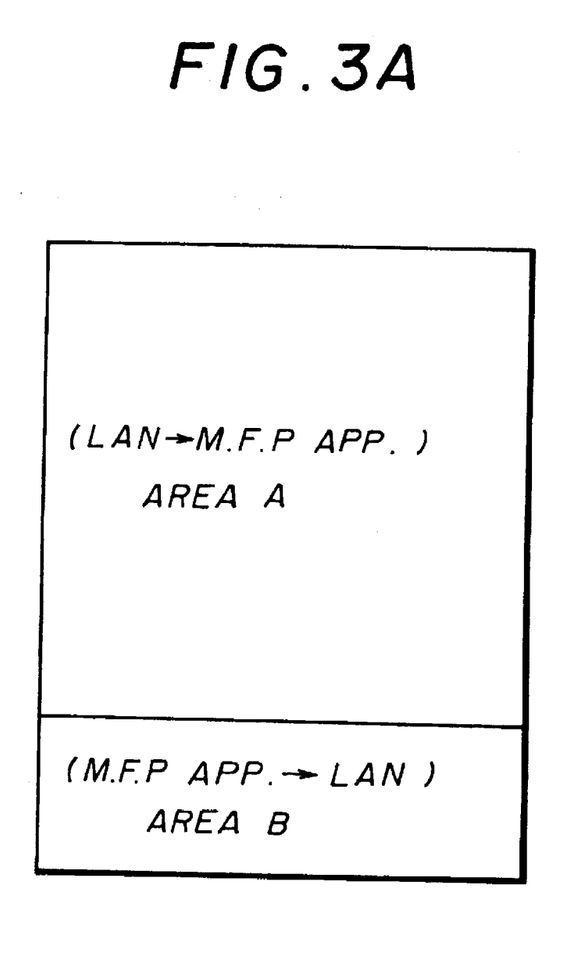
FIGS. 3A and 3B illustrate alteration of the format of the common memory in the LAN board in the system shown in FIG. 1.
Figure 3B:
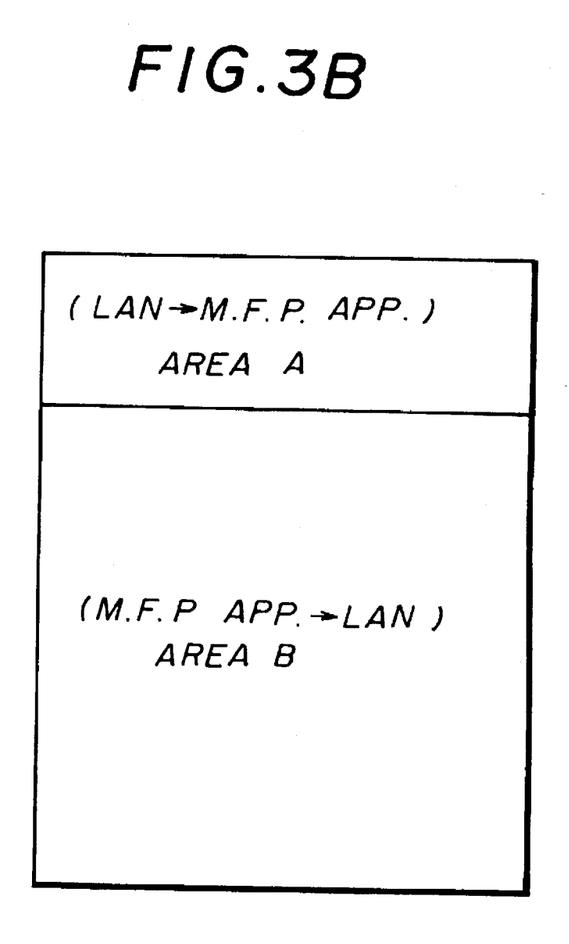

With reference to FIGS. 3A and 3B, examples of data storage formats of the common memory 3 obtained as a result of alteration of the initially set data storage format will now be described. The LAN board 1, when the printer function is selected in the multifunction peripheral apparatus 9, alters the format of the common memory 3 to a printer-type format as shown in FIG. 3A. In the printer-type format, as shown in the figure, the area A for storing data being transmitted from the LAN 8 to the multifunction peripheral apparatus 9 is larger than the area B for storing data being transmitted from the multifunction peripheral apparatus 9 to the LAN 8. The LAN board 1, when the scanner function is selected in the multifunction peripheral apparatus 9, alters the format of the common memory 3 to a scanner-type format as shown in FIG. 3B. In the printer-type format, as shown in the figure, area B for storing data being transmitted from the multifunction peripheral apparatus 9 to the LAN 8 is larger than the area A for storing data being transmitted from the LAN 8 to the multifunction peripheral apparatus 9.

Figure 4:
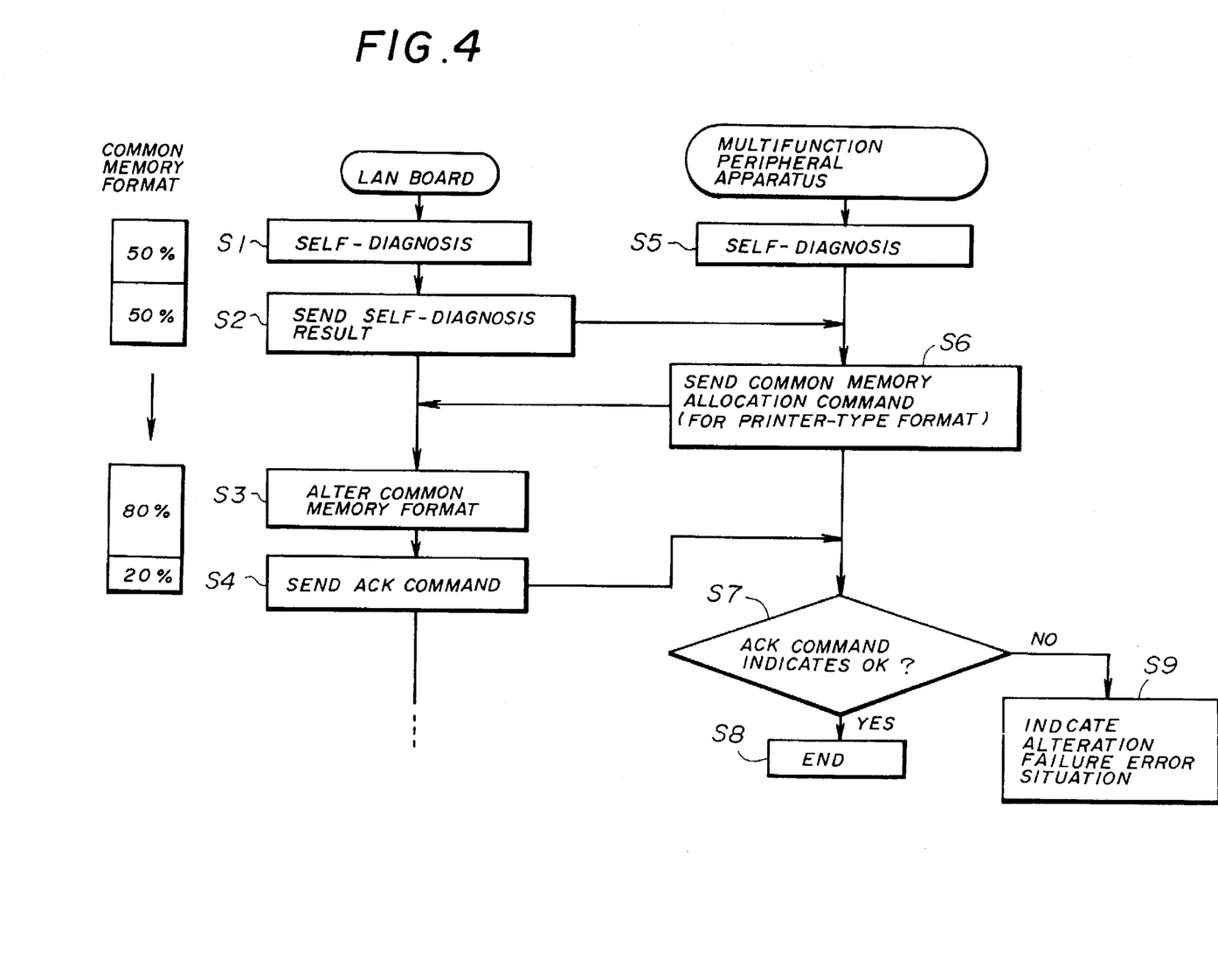
FIG. 4 shows a flowchart of an operation of altering the format of the common memory in the LAN board shown in FIG. 1.

With reference to FIG. 4, an operation of altering the data storage format of the common memory 3 in the LAN board 1 will now be described. When the system is initialized, the entire storage area of the common memory 2 is equally divided into the areas A and B as mentioned above. Then, in a step S1 (the term 'step' will be omitted hereinafter), the CPU 2 performs a self-diagnosis operation on the LAN board 1. Then, a result of the self-diagnosis operation is sent to the multifunction peripheral apparatus 9 in S2. The multifunction peripheral apparatus 9 also performs a self-diagnosis operation on itself in S5 and then receives the result of the self-diagnosis operation from the LAN board 1.

Then, in S6, the multifunction peripheral apparatus 9 sends a command to the LAN board 1 indicating a datastorage-area allocation in the common memory 3 appropriate for a function which is selected from among the printer, scanner, facsimile and so forth functions in the multifunction peripheral apparatus 9. For example, the data-storage-area allocation of the printer-type format appropriate for the printer function being selected is such that 80% of the entire storage area of the common memory 3 is allocated as the area A and the remaining 20% is allocated as the area B. The data-storage-area allocation of the scanner-type format appropriate for the scanner function being selected is such that 80% of the entire storage area of the common memory 3 is allocated as the area B and the remaining 20% is allocated as the area A. After sending the command to the LAN board 1, the multifunction peripheral apparatus 9 waits for an ACK command to be sent from the LAN board 1.

The LAN board 1, upon receiving the command indicating the data-storage-area allocation of the common memory 3, performs the data-storage-area altering operation according to the thus-received command in S3. Thus, in the example of the printer function being selected, the data-storage-area allocation appropriate is such that 80% of the entire storage area of the common memory 3 is allocated as the area A and the remaining 20% is allocated as the area B. In S4, if the data-storage-area alteration operation has been achieved, the LAN board 1 writes the ACK command indicating OK in the above-mentioned DATA START OFFSET region in the area A of the common memory 3 and thus sends it to the multifunction peripheral apparatus 9. In S4, if the data-storage-area alteration operation could not be properly achieved, the LAN board 1 writes the ACK command indicating NO in the above-mentioned DATA START OFFSET region in the area A of the common memory 3 and thus sends it to the multifunction peripheral apparatus 9.

After receiving the ACK command, the multifunction peripheral apparatus 9 determines in S7 whether the received ACK command indicates OK or NO. If it is OK, the multifunction peripheral apparatus 9 performs S8 and thus terminates the current operation. If it is NO, the apparatus 9 performs S9 and thus performs a predetermined operation appropriate for a situation in which the data-storage-area alteration operation has failed. Thus, an error-indication signal is emitted.

Thus, the LAN board 1 in the first embodiment of the present invention automatically alters the format of the common memory 3 so as to make it appropriate for a function selected in the multifunction peripheral apparatus 9. Accordingly, a single one of the LAN board 1 may be commonly used for the printer function, scanner function, facsimile function and so forth selected in the multifunction peripheral apparatus 9. Further, the multifunction peripheral apparatus 9 may arbitrarily set the data-storage-area allocation in the common memory 3 in the LAN board 1, if necessary, by specifying it to the LAN board 1.

Figure 5:
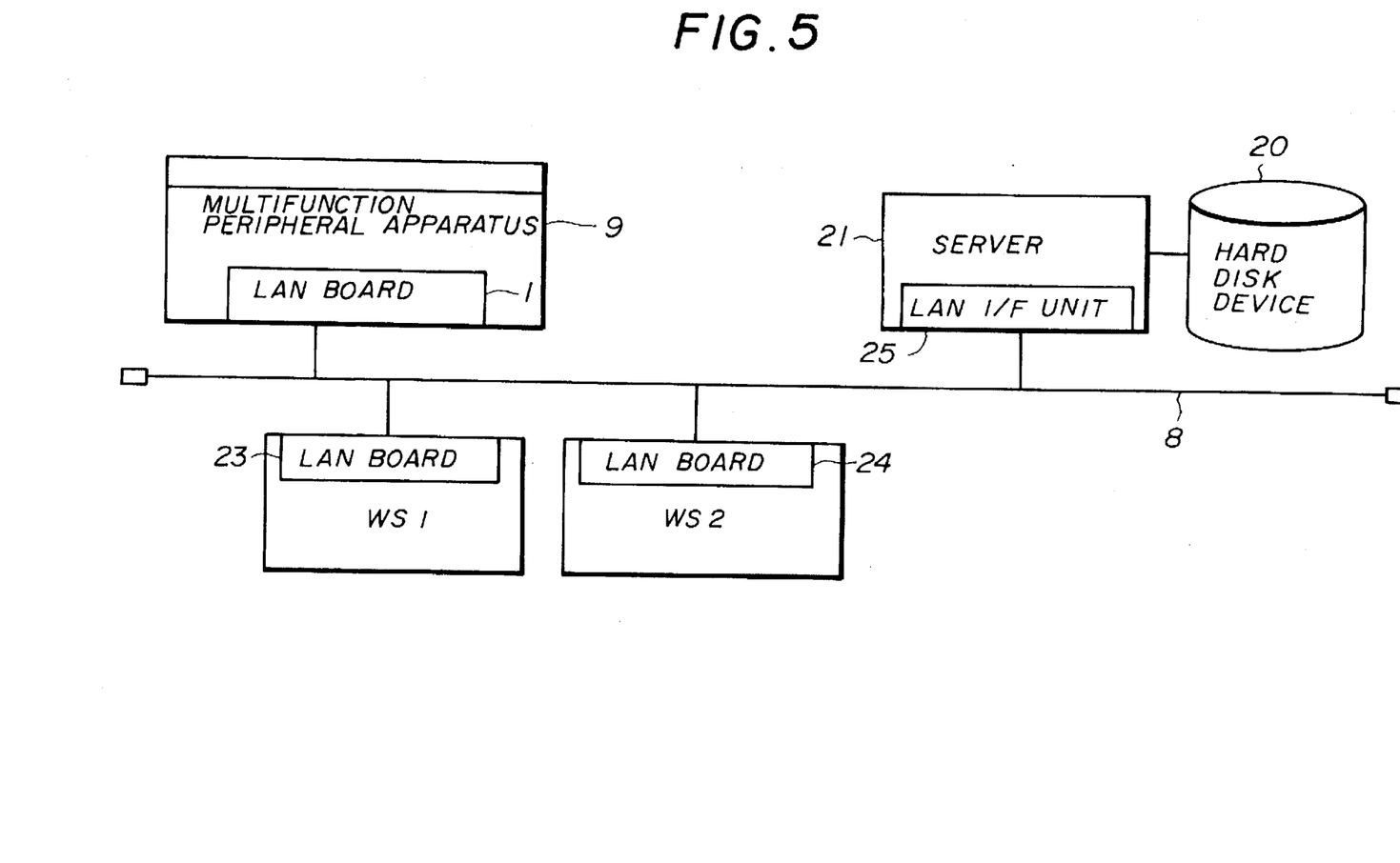
FIG. 5 shows a block diagram of a system using the LAN board in a second embodiment of the present invention.

A second embodiment of the present invention will now be described with reference to FIG. 5 which shows a system including the LAN board in the second embodiment. The same reference numerals are given to components the same as those in the system shown in FIG. 1. The system shown in FIG. 5 includes two workstations WS1, WS2, a server 21 to which a hard disk device 20 is connected and the multifunction peripheral apparatus 9.

The workstation WS1 is connected to a LAN board 23, the workstation WS2 is connected to a LAN board 24 and the multifunction peripheral apparatus 9 is connected to the LAN board 1. Each of the LAN boards 23, 24 and 1 is connected to the LAN 8. The server 21 has a LAN interface (I/F) unit 25 which is also connected to the LAN 8.

Each of the workstations WS1 and WS2 includes a microcomputer which enables data communication between the LAN 8 and the relevant workstation through the relevant LAN board. Each of the workstations WS1 and WS2 may select one of the functions of the multifunction peripheral apparatus 9 and performs the data communication with the multifunction peripheral apparatus 9 for executing the thus-selected function. Further, each of the workstations WS1 and WS2 may perform data reading and data writing on the hard disk device 20 through the server 21 through the data communication therebetween.

The hard disk device 20 is an information storage device for storing various kinds of data. The server 21 receives data from the workstations WS1, WS2, or from the multifunction peripheral apparatus 9 via the LAN 8, and stores the data in the hard disk device 20. Further, the server 21 obtains data from the hard disk device 20, and outputs the data to the workstations WS1, WS2, or the multifunction peripheral apparatus 9 via the LAN 8.

The multifunction peripheral apparatus 9 has a plurality of functions such as the printer function, scanner function and facsimile function, and operates so as to execute a function, of the plurality of functions, specified by a relevant one of the workstations WS1 and WS2.

The LAN board 1 in the second embodiment has the same construction as that of the LAN board 1 shown in FIG. 1. However, a function of the LAN board 1 in the second embodiment is different from that of the LAN board 1 shown in FIG. 1. The CPU 2 in the LAN board 1 in the second embodiment receives from the LAN 8 a specification of a function to be selected of the multifunction peripheral apparatus 9, and outputs a function-selection specification based on the thus-received specification to the multifunction peripheral apparatus 9. The CPU 2 further alters the format of the common memory 3 so as to make it appropriate for the function selected in the multifunction peripheral apparatus 9.

An operation of the LAN board 1 in the second embodiment altering the format of the common memory 3 will now be described with reference to FIG. 6. The LAN board 1 is connected to the multifunction peripheral apparatus 9 as shown in FIG. 5. When the system is started up, the LAN board 1 performs a data-storage-area allocation of the common memory 3 as an initial setting and thus the entire storage area thereof is equally divided into the area A and the area B. In S11, the CPU 2 performs a self-diagnosis. Then, the CPU 2 sends a result of the self-diagnosis to the multifunction peripheral apparatus 9 in S12.

The multifunction peripheral apparatus 9 also performs self-diagnosis in S23, and then receives the result of the self-diagnosis from the LAN board 1. Then, in S24, the multifunction peripheral apparatus 9 sends the LAN board 1 a command for altering the format of the common memory 3. The command specifies alteration of the format of the common memory 3 so as to make the format appropriate for a currently selected function of the multifunction peripheral apparatus 9. The currently selected function is a function which was previously set as a default or a function which was selected before power supply to the system was previously disconnected. When, for example, the printer function was previously selected, the command specifies the data-storage-area allocation such that 80% of the entire storage area of the common memory 3 is allocated as the area A.

The LAN board 1 receives this command from the multifunction peripheral apparatus 9 and thus alters the format of the common memory 3 according to the command in S13. In the above-mentioned example, 80% of the entire storage area of the common memory 3 is allocated as the area A, and 20% as the area B. In S14, if this data-storage-area alteration operation has been achieved, the LAN board 1 sends the ACK command indicating OK to the multifunction peripheral apparatus 9. In S14, if the data-storage-area alteration operation could not be achieved, the LAN board 1 sends the ACK command indicating NO to the multifunction peripheral apparatus 9.

After receiving the ACK command, the multifunction peripheral apparatus 9 determines whether the received ACK command indicates OK or NO. If it is OK, the multifunction peripheral apparatus 9 then terminates the current operation. If it is NO, the apparatus 9 then performs a predetermined operation appropriate for a situation in which the data-storage-area alteration operation has failed.

Then, for example, the workstation WS1 establishes a session with the LAN board 1 according to a predetermined LAN protocol stored in the LAN board 1. Then, if the workstation WS1 will cause the multifunction peripheral apparatus 9 to print out certain data, before transmitting the certain data to be printed, the workstation WS1 transmits a packet, to the LAN board 1, for specifying a desired function of the functions of the multifunction peripheral apparatus 9 in S28. In this case, the printer function is specified by the packet. After the LAN board 1 has received the packet from the workstation WS1, the CPU 2 sends a command to the multifunction peripheral apparatus 9 for instructing a selection of the printer function, based on the data of the packet in S15.

The multifunction peripheral apparatus 9 selects the printer function in response to the relevant command being sent by the CPU 2 of the LAN board 1. Then, in S25, the multifunction peripheral apparatus 9 sends a command to the LAN board 1 for altering the format of the common memory 3 to cause the format to be appropriate for the printer function being selected. Specifically, the command specifies a data-storage-area allocation of the common memory 3 such that 80% of the entire storage area is allocated as the area A.

In response to receiving this command from the multifunction peripheral apparatus 9, the CPU 2 of the LAN board 1 alters the format of the common memory 3 and thus 80% of the entire area of the common memory 3 is allocated as the area A, and 20% as the area B, in S16.

Then, the LAN board 1 sends the ACK command indicating OK to the multifunction peripheral apparatus 9 in S17 when the above-mentioned data-storage-area allocation operation has been completed. Further, the LAN board 1 sends data to the workstation WS1 for indicating that the printer function has been selected in the multifunction peripheral apparatus 9. In response to receiving the ACK command indicating OK, the multifunction peripheral apparatus 9 enters a state of waiting for data to be printed.

If the LAN board 1 could not properly complete the relevant data-storage-area allocation, the LAN board 1 sends the ACK command indicating NO to the multifunction peripheral apparatus 9. As a result, the apparatus 9 performs a predetermined operation appropriate for a situation in which the data-storage-area alteration operation has failed.

In response to receiving the data from the LAN board 1 indicating that the printer function has been selected in the multifunction peripheral apparatus 9, the workstation WS1 sends the certain data to be printed out to the LAN board 1 in S29. After receiving the certain data to be printed out from the workstation WS1, the LAN board 1 uses the common memory 3 having the relevant data-storage-area allocation performed as mentioned above, and thus transfers the thus-received data to the multifunction peripheral apparatus 9 in S18.

After receiving the data thus transferred from the LAN board 1, the multifunction peripheral apparatus 9 prints out the thus-received data. After completing the printing out operation, the workstation WS1 closes the session between the workstation WS1 and the LAN board 1.

Then, for example, when the workstation WS2 establishes a session with the LAN board 1 according to a predetermined LAN protocol stored in the LAN board 1. Then, if the workstation WS2 will cause the multifunction peripheral apparatus 9 to read in a certain image, the workstation WS2 transmits a packet, to the LAN board 1, for specifying a desired function of the functions of the multifunction peripheral apparatus 9 in S30. In this case, the scanner function is specified by the packet as the desired one. After the LAN board 1 has received the packet from the workstation WS2, the CPU 2 sends a command to the multifunction peripheral apparatus 9 for instructing a selection of the scanner function, based on the data of the packet in S19.

The multifunction peripheral apparatus 9 selects the scanner function in response to the relevant command being sent by the CPU 2 of the LAN board 1. Then, in S26, the apparatus 9 sends a command to the LAN board 1 for altering the format of the common memory 3 to cause the format to be appropriate for the scanner function being selected. Specifically, the command specifies a data-storage-area allocation of the common memory 3 such that 70% of the entire storage area is allocated as the area B.

In response to receiving this command from the multifunction peripheral apparatus 9, the CPU 2 of the LAN board 1 alters the format of the common memory 3 and thus 70% of the entire area of the common memory 3 is allocated as the area B, and 30% as the area A in S20.

Then, the LAN board 1 sends the ACK command indicating OK to the multifunction peripheral apparatus 9 in S21 when the above-mentioned data-storage-area allocation operation has been completed. Further, the LAN board 1 sends data to the workstation WS2 for indicating that the scanner function has been selected in the multifunction peripheral apparatus 9.

If the LAN board 1 could not properly complete the relevant data-storage-area allocation, the LAN board 1 sends the ACK command indicating NO to the multifunction peripheral apparatus 9 in S21. As a result, the apparatus 9 performs a predetermined operation appropriate for a situation in which the data-storage-area alteration operation has failed.

In response to receiving the ACK command indicating OK, the multifunction peripheral apparatus 9 scans the certain image, and transmits data thus obtained from the certain image to the LAN board 1 in S27. After receiving the thus-transmitted data, the LAN board 1 uses the common memory 3 having the relevant data-storage-area allocation performed as mentioned above, and thus transfers the thus-received data to the workstation WS2 in S22.

After receiving the data thus transferred from the LAN board 1, the workstation WS2 stores it, and then closes the session between the workstation WS2 and the LAN board 1.

In the above-described operation, each time the LAN board 1 alters the format of the common memory 3, if a previous format of the common memory 3 is the same as a current requested format, a format alteration operation can be eliminated accordingly.

Figure 6:
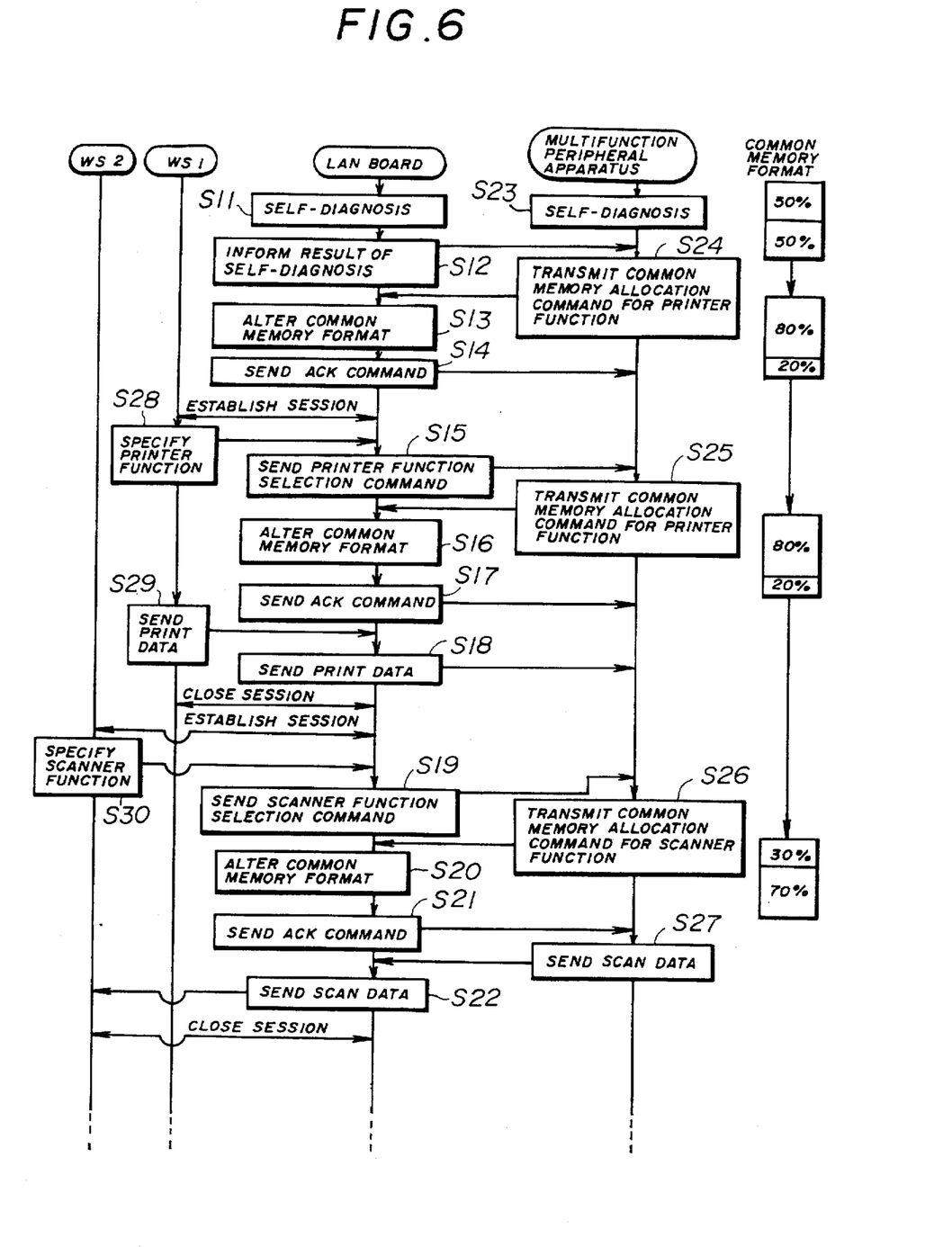
FIG. 6 shows a flowchart of an operation of altering the format of the common memory in the LAN board in the second embodiment.

Although not shown in FIG. 6, there may be a case where the multifunction peripheral apparatus 9 has a function, such as a facsimile function, other than the printer and scanner functions. In this case, when receiving a packet specifying the relevant function of the multifunction peripheral apparatus 9 from one of the workstations, the LAN board 1 sends a command to the multifunction peripheral apparatus 9 for instructing a selection of the relevant function.

Then, according to the thus-sent command, the multifunction peripheral apparatus 9 sends a command to the LAN board 1 for altering the format of the common memory 3 so as to cause the format to be appropriate for the relevant function. The LAN board 1 alters the format of the common memory 3 according to the thus-sent command. Thus, the data-storage-area allocation in the common memory 3 is performed on the format thereof and thus the format becomes appropriate for the relevant function which is selected in the multifunction peripheral apparatus 9.

Thus, the LAN board 1 in the second embodiment of the present invention automatically alters the format of the common memory 3 so as to make it appropriate for a function selected in the multifunction peripheral apparatus 9. Accordingly, a single one of the LAN board 1 may be commonly used for the printer function, scanner function, facsimile function and so forth selected in the multifunction peripheral apparatus 9. Further, the multifunction peripheral apparatus 9 may arbitrarily set the data-storage-area allocation in the common memory 3 of the LAN board, if necessary, by specifying it to the LAN board 1.

A third embodiment of the present invention will now be described. A construction of a system in the third embodiment is the same as the that of the system shown in FIG. 5. The multifunction peripheral apparatus 9 has the printer and scanner functions.

An internal construction of the LAN board 1 in the third embodiment is the same as that of the LAN board 1 shown in FIG. 1, but a function thereof is different from the function of the LAN board 1 shown in FIG. 1. The LAN board 1 in the third embodiment analyzes a protocol according to which data is communicated between the LAN 8 and LAN board 1. Based on a result of this analysis, the LAN board 1 determines a function to be selected in the multifunction peripheral apparatus 9, and outputs a specification of the selection of the function to the multifunction peripheral apparatus 9. The LAN board 1 then alters the format of the common memory 3 so as to make it appropriate for the function thus selected in the multifunction peripheral apparatus 9.

An operation of the LAN board 1 in the third embodiment appropriately altering the format of the common memory 3 will now be described with reference to FIG. 7. The LAN board 1 is connected to the multifunction peripheral apparatus 9 as shown in FIG. 5. When the system is started up, the LAN board 1 performs a data-storage-area allocation of the common memory 3 as an initial setting and thus the entire storage area thereof is equally divided into the area A and the area B. In S31, the CPU 2 performs a self-diagnosis. Then, the CPU 2 sends a result of the self-diagnosis to the multifunction peripheral apparatus 9 in S32.

The multifunction peripheral apparatus 9 also performs self-diagnosis in S44, and then receives the result of the self-diagnosis from the LAN board 1. Then, in S45, the multifunction peripheral apparatus 9 sends the LAN board 1 a command for altering the format of the common memory 3. The command specifies alteration of the format of the common memory 3 so as to make the format appropriate for a currently selected function between the printer and scanner functions of the multifunction peripheral apparatus 9. When, for example, the printer function is selected, the command specifies the data-storage-area allocation such that 80% of the entire storage area of the common memory 3 is allocated as the area A.

The LAN board 1 receives this command from the multifunction peripheral apparatus 9 and thus alters the format of the common memory 3 according to the command in S33. In the above-mentioned example, 80% of the entire storage area of the common memory 3 is allocated as the area A, and 20% as the area B. In S34, if this data-storage-area alteration operation has been achieved, the LAN board 1 sends the ACK command indicating OK to the multifunction peripheral apparatus 9. In S34, if the data-storage-area alteration operation could not be achieved, the LAN board 1 sends the ACK command indicating NO to the multifunction peripheral apparatus 9.

After receiving the ACK command, the multifunction peripheral apparatus 9 determines whether the received ACK command indicates OK or NO. If it is OK, the multifunction peripheral apparatus 9 then terminates the current operation. If it is NO, the apparatus 9 then performs a predetermined operation appropriate to a situation in which the data-storage-area alteration operation has failed.

For example, the workstation WS1 establishes a session with the LAN board 1 according to a predetermined LAN protocol stored in the LAN board 1. If the workstation WS1 will cause the multifunction peripheral apparatus 9 to print out certain data, the workstation WS1 establishes the session according to a predetermined LAN print protocol. The LAN board 1 analyzes, in S35, whether the protocol used in the session establishment is a print protocol or a scanner protocol. This analysis is performed using data, for example, a session ID (identifier), which is sent from the workstation WS1 during a session establishment operation. The session ID indicates whether the relevant protocol is the print protocol or scanner protocol. In this case, the LAN board 1 determines that the protocol used in the session establishment is the print protocol. Then, in S36, the LAN board 1 transmits a command to the multifunction peripheral apparatus 9 for instructing a selection of the printer function.

In this embodiment, no special command is required to be supplied, for instructing the selection of the printer function, such as that sent by the workstation WS1 in S28 shown in FIG. 6. The LAN board 1 analyzes using ordinary data which is generally sent from the workstation WS1 when establishing a session. Thus, it is possible to eliminate an extra operation for instructing the selection of the printer function to be performed by the workstation WS1.

The multifunction peripheral apparatus 9 selects the printer function in response to the relevant command being sent by the CPU 2 of the LAN board 1 in S36. Then, in S46, the apparatus 9 sends a command to the LAN board 1 for altering the format of the common memory 3 to cause the format to be appropriate to the printer function being selected. Specifically, the command specifies a data-storage-area allocation of the common memory 3 such that 80% of the entire storage area is allocated as the area A.

In response to receiving this command from the multifunction peripheral apparatus 9, the CPU 2 of the LAN board 1 alters the format of the common memory 3 and thus 80% of the entire area of the common memory 3 is allocated as the area A, and 20% as the area B, in S37.

Then, the LAN board 1 sends the ACK command indicating OK to the multifunction peripheral apparatus 9 in S38 when the above-mentioned data-storage-area allocation operation has been completed. Further, the LAN board 1 sends data to the workstation WS1 for indicating that the printer function has been selected in the multifunction peripheral apparatus 9. In response to receiving the ACK command indicating OK, the multifunction peripheral apparatus 9 enters a state of waiting for data to be printed.

If the LAN board 1 could not properly complete the relevant data-storage-area allocation, the LAN board 1 sends the ACK command indicating NO to the multifunction peripheral apparatus 9. As a result, the apparatus 9 performs a predetermined operation appropriate to a situation in which the data-storage-area alteration operation has failed.

In response to receiving the data from the LAN board 1 indicating that the printer function has been selected in the multifunction peripheral apparatus 9, the workstation WS1 sends the certain data to be printed out to the LAN board 1 in S49. After receiving the certain data to be printed out from the workstation WS1, the LAN board 1 uses the common memory 3 having the relevant data-storage-area allocation performed as mentioned above, and thus transfers the thus-received data to the multifunction peripheral apparatus 9 in S39.

After receiving the data thus transferred from the LAN board 1, the multifunction peripheral apparatus 9 prints out the thus-received data. After completing the printing out operation, the workstation WS1 closes the session between the workstation WS1 and the LAN board 1.

For example, the workstation WS2 establishes a session with the LAN board 1 according to a predetermined LAN protocol stored in the LAN board 1. Then, if the workstation WS2 will cause the multifunction peripheral apparatus 9 to read in a certain image, the workstation WS2 establishes the session using a predetermined LAN scanner protocol. The LAN board 1 analyzes, in S35, whether the protocol used in the session establishment is the print protocol or the scanner protocol. This analysis is performed using data, for example, a session ID (identifier), which is sent from the workstation WS2 during a session establishment operation. The session ID indicates whether the relevant protocol is the print protocol or scanner protocol. In this case, the LAN board 1 determines that the protocol used in the session establishment is the scanner protocol. Then, in S40, the LAN board 1 transmits a command to the multifunction peripheral apparatus 9 for instructing a selection of the scanner function.

In this embodiment, no special command is required to be supplied, for instructing the selection of the scanner function, such as that sent by the workstation WS2 in S30 shown in FIG. 6. The LAN board 1 analyzes using ordinary data which is generally sent from the workstation WS2 when establishing a session. Thus, it is possible to eliminate an extra operation for instructing the selection of the scanner function to be performed by the workstation WS2.

The multifunction peripheral apparatus 9 selects the scanner function in response to the relevant command being sent by the CPU 2 of the LAN board 1. Then, in S47, the apparatus 9 sends a command to the LAN board 1 for altering the format of the common memory 3 to cause the format to be appropriate to the scanner function being selected. Specifically, the command specifies a data-storage-area allocation of the common memory 3 such that 70% of the entire storage area is allocated as the area B.

In response to receiving this command from the multifunction peripheral apparatus 9, the CPU 2 of the LAN board 1 alters the format of the common memory 3 and thus 70% of the entire area of the common memory 3 is allocated as the area B, and 30% as the area A in S41.

Then, the LAN board 1 sends the ACK command indicating OK to the multifunction peripheral apparatus 9 in S42 when the above-mentioned data-storage-area allocation operation has been completed. Further, the LAN board 1 sends data to the workstation WS2 for indicating that the scanner function has been selected in the multifunction peripheral apparatus 9. If the LAN board 1 could not properly complete the relevant data-storage-area allocation, the LAN board 1 sends the ACK command indicating NO to the multifunction peripheral apparatus 9. As a result, the apparatus 9 performs a predetermined operation appropriate for a situation in which the data-storage-area alteration operation has failed.

In response to receiving the ACK command indicating OK, the multifunction peripheral apparatus 9 scans the certain image, and transmits data thus obtained from the certain image to the LAN board 1 in S48. After receiving the thus-transmitted data, the LAN board 1 uses the common memory 3 having the relevant data-storage-area allocation performed as mentioned above, and thus transfers the thus-received data to the workstation WS2 in S43.

After receiving the data thus transferred from the LAN board 1, the workstation WS2 stores it, and then closes the session between the workstation WS2 and the LAN board 1.

In the above-described operation, each time the LAN board 1 alters the format of the common memory 3, if the previous format of the common memory 3 is the same as a current requested format, a format alteration operation can be eliminated accordingly.

Figure 7:
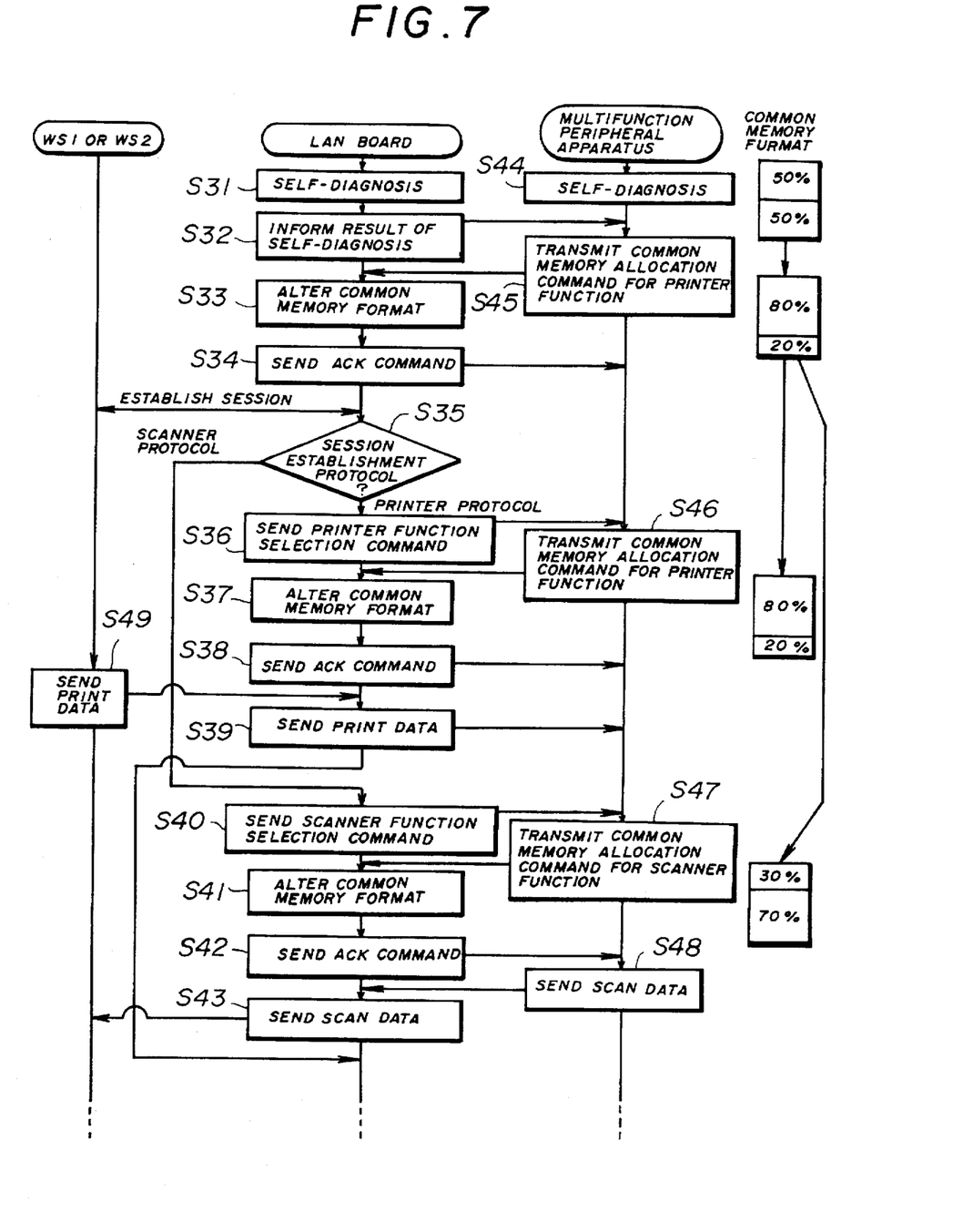
FIG. 7 shows a flowchart of an operation of altering the format of the common memory in the LAN board in a third embodiment.

Although not shown in FIG. 7, there may be a case where the multifunction peripheral apparatus 9 has functions such as a facsimile function and so forth other than the printer and scanner functions. In this case, when establishing a session between the a relevant workstation and the LAN board 1, the LAN board 1 analyzes data sent from the workstation, and thus determines which protocol is used in the session establishment among a print protocol, a scanner protocol, and other protocols relevant to the other functions such as the facsimile function and so forth. The LAN board 1 then sends a command to the multifunction peripheral apparatus 9 for instructing a selection of the printer function if the print protocol is used, the scanner function if the scanner protocol is used, and the respective functions if the relevant protocols are used.

Then, according to the thus-sent command, the multifunction peripheral apparatus 9 sends a command to the LAN board 1 for altering the format of the common memory 3 so as to cause the format to be appropriate to the relevant function. The LAN board 1 alters the format of the common memory 3 according to the thus-sent command. Thus, the data-storage-area allocation in the common memory 3 is performed on the format thereof and thus the format becomes appropriate to the relevant function which is selected in the multifunction peripheral apparatus 9.

Thus, the LAN board 1 in the third embodiment of the present invention determines, based on a result of analysis of data sent from a relevant workstation when a session is being established, which function, among the printer function, scanner function and the other functions, if any, of the multifunction peripheral apparatus 9, the relevant workstation will use. As a result, the workstations are not required to generate a special command for instructing a function to be selected. Thus a load to be borne by the workstations may be reduced.

Further, the LAN board 1 in the third embodiment of the present invention automatically alters the format of the common memory 3 so as to make it appropriate for a function selected in the multifunction peripheral apparatus 9. Accordingly, a single one of the LAN board 1 may be commonly used for the printer function, scanner function, facsimile function and so forth selected in the multifunction peripheral apparatus 9. Further, the multifunction peripheral apparatus 9 may arbitrarily set the data-storage-area allocation in the common memory 3 of the LAN board 1, if necessary, by specifying it to the LAN board 1.

In each of the second and third embodiments, the CPU 2 of the LAN board 1 alters the format of the common memory 3 according to a command supplied by the multifunction peripheral apparatus 9. However, in the second embodiment, it is also possible that the CPU 2 of the LAN board 1 alters the format of the common memory 3 according to the specification, of a function to be selected in the multifunction peripheral apparatus 9, supplied (in S28, S30 shown in FIG. 6) by a relevant workstation via the LAN 8.

In the third embodiment, it is possible that the CPU 2 of the LAN board 1 alters the format of the common memory 3 according to a result of the analysis of data sent from the relevant workstation in the session establishment. The analysis supplies information as to, using which protocol of the printer protocol, scanner protocol and the other protocol, if any, the session establishment is performed. Based on this information, the CPU 2 of the LAN board 1 may alter the format of the common memory 3 so as to make it appropriate for the printer function if the information indicates that the print protocol is used. The CPU 2 of the LAN board 1 may alter the format of the common memory 3 so as to make it appropriate for the scanner function if the information indicates that the scanner protocol is used. The CPU 2 of the LAN board 1 may alter the format of the common memory 3 so as to make it appropriate for the other functions, if any, if the information indicates that the relevant protocols are used, respectively.

Thereby, the multifunction peripheral apparatus 9 is not required to send the command to the LAN board 1, and thus a load borne by the apparatus 9 may be reduced. Further, the alteration of the format of the common memory 3 can be rapidly performed and thus data communication between the LAN 8 and multifunction peripheral apparatus 9 can be rapidly performed using the common memory 3 having the format thus altered.

The LAN board 1 in each of the first, second and third embodiments of the present invention is one which is used for performing data communication using a single kind of protocol. The LAN board in a fourth embodiment of the present invention is one for performing data communication using a plurality of protocols such as the above-mentioned TCP/IP, NetWare, AppleTalk, and so forth/or the like. The LAN board 30 in the fourth embodiment will now be described with reference to FIG. 8. The LAN board 30 is connected to the multifunction peripheral apparatus, and the LAN 8 has a workstation not shown in the figure connected thereto.

The LAN board 30 includes a microcomputer. The microcomputer may be such as that including a ROM storing various control programs and so forth executed by the CPU, and a RAM used as a work area by the CPU when the CPU performs various kinds of operations according to the control programs and so forth. Thus, the microcomputer embodies a LAN driver 31, an A-protocol unit 32, a B-protocol unit 33, an A-protocol print-protocol unit 34, an A-protocol scanner-protocol unit 35, a B-protocol print-protocol unit 36, a B-protocol scanner-protocol unit 37, and a multifunction-peripheral-apparatus interface unit 38, shown in FIG. 8. The LAN board 30 may be used for data communication using two kinds of protocols, an A-protocol and a B-protocol. For example, the A-protocol is the above-mentioned AppleTalk and the B-protocol is the above-mentioned NetWare.

Figure 8:
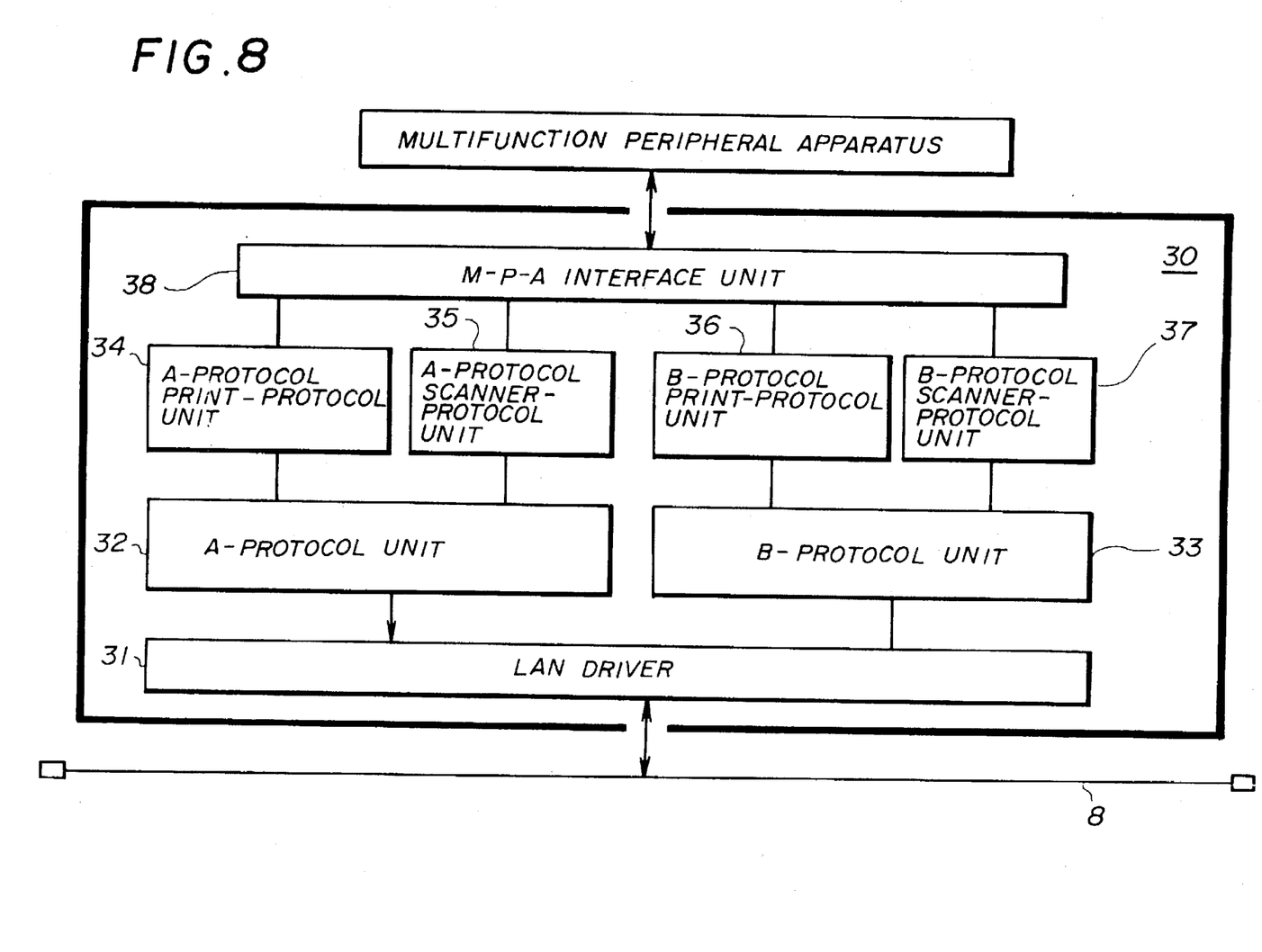
FIG. 8 shows an internal construction of the LAN board in a fourth embodiment of the present invention.

The LAN driver 31 controls data communication with the workstation connected to the LAN 8. The A-protocol unit 32 performs data communication using the A-protocol. The B-protocol unit 33 performs data communication using the B-protocol. The A-protocol print-protocol unit 34 performs communication of data to be printed out using a print protocol of the A-protocol. The A-protocol scanner-protocol unit 35 performs communication of data scanned and thus read in, using a scanner protocol of the A-protocol. The B-protocol print-protocol unit 36 performs communication of data to be printed out using a print protocol of the B-protocol. The B-protocol scanner-protocol unit 37 performs communication of data scanned and thus read in, using a scanner protocol of the B-protocol.

The multifunction-peripheral-apparatus interface unit 38 is provided with the common memory. When performing data communication between the LAN 8 and multifunction peripheral apparatus, the multifunction-peripheral-apparatus interface unit 38 stores data received from one in the common memory and then sends the thus-stored data to the other.

The LAN board 31 analyzes data sent from the workstation via the LAN 8 when a session is being established with the workstation, and thus determines whether the A-protocol or B-protocol is used. A relevant one of the A-protocol unit 32 and B-protocol unit 33 analyzes the data sent from the workstation and thus determines whether the print protocol or scanner protocol is used. Based on the determination, a relevant one of the A-protocol print-protocol unit 34, A-protocol scanner-protocol unit 35, B-protocol print-protocol unit 36, and B-protocol scanner-ptorocol unit 37 outputs, to the multifunction peripheral apparatus, instructions for selecting a relevant one of the printer function and scanner function. After the multifunction peripheral apparatus selects the relevant function according to the thus-output instructions, the relevant one of the A-protocol print-protocol unit 34, A-protocol scanner-ptorocol unit 35, B-protocol print-protocol unit 36, and B-protocol scanner-protocol unit 37 alters the format of the common memory so as to make it appropriate to the thus-selected function of the multifunction peripheral apparatus.

An operation, of altering the format of the common memory, of the LAN board in the fourth embodiment of the present invention will now be described. A case will now be assumed in which the workstation will cause the multifunction peripheral apparatus to, for example, print out data, and a print protocol of the A-protocol, for example, is used for this purpose. In this case, the workstation establishes a session with the LAN board 30 using the print protocol of the A-protocol. In the session establishment, the LAN driver 31 analyzes data sent from the workstation via the LAN 8 and thus determines whether the A-protocol or B-protocol is used. This analysis may be performed using, for example, a protocol identifier included in data sent from the workstation via the LAN 8 when the session is being established, which protocol indicates whether the A-protocol or B-protocol is used.

When the LAN driver 31 thus determines that the A-protocol is used, the LAN driver gives data sent from the workstation via the LAN 8 to the A-protocol unit 32.

The A-protocol unit 32 analyzes data given by the LAN driver 31 and thus determines whether a print protocol or a scanner protocol of the A-protocol is used. This analysis may be performed using, for example, the session ID included in the data given by the LAN driver 31, which session ID indicates whether the print protocol or scanner protocol of the A-protocol is used. When the A-protocol unit 32 thus determines that the print protocol of the A-protocol is used, the A-protocol unit 32 gives the data given by the LAN driver 31 to the A-protocol print-protocol unit 34.

Based on the result of the analysis performed by the A-protocol unit 32, the A-protocol print-protocol unit 34 outputs a command to the multifunction peripheral apparatus via the multifunction-peripheral-apparatus interface unit 38, for instructing a selection of the printer function.

When receiving this command from the LAN board 30, the multifunction peripheral apparatus selects the printer function, and sends a command to the LAN board 30 for instructing alteration of the format of the common memory of the multifunction-periphral-apparatus interface unit 38, which format thus has a data-storage-area allocation appropriate for the printer function.

Upon receiving this command from the multifunction peripheral apparatus via the multifunction-peripheral-apparatus interface unit 38, the A-protocol print-protocol unit 34 alters the format of the common memory of the multifunction-peripheral-apparatus interface unit 38, which format thus have a data-storage-area allocation appropriate for the printer function. Then, the LAN board 30 receives data to be printed out from the workstation via the LAN 8, and supplies the data to the multifunction peripheral apparatus which thus prints out the data. In this data communication, the common memory having the thus-altered format is used as mentioned above.

Another case will now be assumed in which the workstation will cause the multifunction peripheral apparatus to, for example, scan and thus read in an image, and a scanner protocol of the B-protocol, for example, is used for this purpose. In this case, the workstation establishes a session with the LAN board 30 using the scanner protocol of the B-protocol. In the session establishment, the LAN driver 31 analyzes data sent from the workstation via the LAN 8 and thus determines whether the A-protocol or B-protocol is used. In this case, it is determined that the B-protocol is used. This analysis may be performed using, for example, a protocol identifier included in data sent from the workstation via the LAN 8 when the session is being established, which protocol indicates whether the A-protocol or B-protocol (in this case, the B-protocol) is used.

When the LAN driver 31 thus determines that the B-protocol is used, the LAN driver thus gives data sent from the workstation via the LAN 8 to the B-protocol unit 33. The A-protocol unit 32 analyzes data given by the LAN driver 31, and thus determines whether a print protocol or a scanner protocol of the B-protocol is used. This analysis may be performed using, for example, the session ID included in the data given by the LAN driver 31, which session ID indicates whether the printer protocol or scanner protocol of the A-protocol (in this case, the scanner protocol) is used. When the B-protocol unit 33 thus determines that the scanner protocol of the B-protocol is used, the B-protocol unit 33 thus gives the data given by the LAN driver 31 to the B-protocol scanner-protocol unit 37.

Based on the result of the analysis performed by the B-protocol unit 33, the B-protocol scanner-protocol unit 37 outputs a command to the multifunction peripheral apparatus via the multifunction-peripheral-apparatus interface unit 38, for instructing a selection of the scanner function.

When receiving this command from the LAN board 30, the multifunction peripheral apparatus selects the scanner function, and sends a command to the LAN board 30 for instructing alteration of the format of the common memory of the multifunction-periphral-apparatus interface unit 38, which format thus has a data-storage-area allocation appropriate for the scanner function.

Upon receiving this command from the multifunction peripheral apparatus via the multifunction-peripheral-apparatus interface unit 38, the B-protocol scanner-protocol unit 37 alters the format of the common memory of the multifunction-peripheral-apparatus interface unit 38, which format thus has a data-storage-area allocation appropriate for the scanner function. Then, the LAN board 30 receives data scanned and thus read through the multifunction peripheral apparatus, and sends the data to the workstation via the LAN 8. In this data communication, the common memory having the thus-altered format is used as mentioned above.

The LAN board 30 in the fourth embodiment described above is used for data communication using the two kinds of protocols, A-protocol and B-protocol, each including two protocols, print protocol and scanner protocol. However, it is also possible to apply the same concept or construct as that of the fourth embodiment to the LAN board used for data communication using the more than two kinds of protocols, each including more than two protocols such as the print protocol, scanner protocol, facsimile protocol, and so forth.

Thus, the LAN board in the fourth embodiment can be used for data communication using a plurality of protocols.

Thus, the data-storage-area allocation of the common memory of the LAN interface apparatus according to the present invention is automatically controlled according to a selected function of the multifunction peripheral apparatus. As a result, a single apparatus of the LAN interface apparatus according to the present invention can be commonly used for the multifunction peripheral apparatus which executes a plurality of functions. Further, the data-storage-area allocation of the common memory is effectively used in data communication between the multifunction peripheral apparatus and the workstation or the like via the LAN. Thus, the data communication can be performed at high speed through a relatively simple construction.

Further, the present invention is not limited to the above-described embodiments, and variations and modifications may be made without departing from the scope of the present invention.

What is claimed is:

1. A network interface apparatus, comprising:

communication means for performing data communication between a multifunction peripheral apparatus and another apparatus via a network, said multifunction peripheral apparatus performing a predetermined plurality of functions;

common storage means for temporarily storing data when said data is being communicated between said multifunction peripheral apparatus and said other apparatus via said network; and alteration means for altering a data-storage-area allocation of said common storage means so as to make said allocation appropriate for a particular function being selected out of said predetermined plurality of functions of said multifunction peripheral apparatus.

2. The network interface apparatus according to claim 1, wherein:

said particular function is specified by data supplied by said other apparatus via said network; and said network interface apparatus further comprises means for determining said particular function based on data sent from said other apparatus via said network.

3. The network interface apparatus according to claim 1, wherein:

said other apparatus uses a predetermined protocol relevant to said particular function when performing data communication with said network interface apparatus via said network; and said network interface apparatus further comprises analyzing means for determining said particular function as a result of analyzing data sent from said other apparatus and thus determining that a protocol being used is said predetermined protocol relevant to said particular function.

4. The network interface apparatus according to claim 3, wherein said analyzing means determines that the protocol being used is said predetermined protocol relevant to said particular function as a result of reading a session identifier (ID) which is included in data sent from said other apparatus when a session is being performed between said other apparatus and said network interface apparatus via said network.

5. The network interface apparatus according to claim 1, wherein:

said other apparatus uses a predetermined plurality of protocols in performing data communication with said network interface apparatus via said network, each of said predetermined plurality of protocols including a plurality of protocols which are relevant to said predetermined plurality of functions respectively; and said network interface apparatus further comprises:

first analyzing means analyzing data sent from said other apparatus and thus determining which of said predetermined plurality of protocols is used; and second analyzing means analyzing data sent from said other apparatus, thus determining which of said plurality of protocols of a thus-determined one of said predetermined plurality of protocols is used, and thus determining said particular function of said predetermined plurality of functions relevant to a thus-determined one of said plurality of protocols.

6. The network interface apparatus according to claim 5, wherein:

said first analyzing means determines which of said predetermined plurality of protocols is used as a result of reading a protocol identifier which is included in data sent from said other apparatus when a session is being performed between said other apparatus and said network interface apparatus via said network; and said second analyzing means determines which of said plurality of protocols of the thus-determined one of said predetermined plurality of protocols is used as a result of reading a session identifier (ID) which is included in data sent from said other apparatus when the session is being performed between said other apparatus and said network interface apparatus via said network.

7. The network interface apparatus according to claim 1, wherein said network comprises a Local Area Network (LAN).

8. The network interface apparatus according to claim 1, wherein said predetermined plurality of functions comprise a printer function, a scanner function and a facsimile function, said printer function being a function executed by said multifunction peripheral apparatus of printing out data sent from said other apparatus via said network and said network interface apparatus;

said scanner function being a function executed by said multifunction peripheral apparatus of scanning and thus reading in an image, thus-obtained data being then sent to said other apparatus via said network interface apparatus and said network; and said facsimile function being a function executed by said multifunction peripheral apparatus of receiving image data via facsimile, thus-obtained image data being then sent to said other apparatus via said network interface apparatus and said network.

* * * * *